US008800133B2

(12) United States Patent
Caprario et al.

(10) Patent No.: US 8,800,133 B2
(45) Date of Patent: Aug. 12, 2014

(54) GAS TURBINE SYSTEMS INVOLVING ROTOR BAYONET COVERPLATES AND TOOLS FOR INSTALLING SUCH COVERPLATES

(75) Inventors: Joseph T. Caprario, Cromview, CT (US); Daniel J. Griffin, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 264 days.

(21) Appl. No.: 13/544,668

(22) Filed: Jul. 9, 2012

(65) Prior Publication Data

US 2012/0311835 A1 Dec. 13, 2012

Related U.S. Application Data

(62) Division of application No. 11/952,367, filed on Dec. 7, 2007, now Pat. No. 8,313,289.

(51) Int. Cl.

| | |
|---|---|
| ***B23P 19/02*** | (2006.01) |
| ***B21K 25/00*** | (2006.01) |
| ***B23P 15/04*** | (2006.01) |
| ***B25B 27/00*** | (2006.01) |
| ***B21D 53/78*** | (2006.01) |
| ***B23Q 3/06*** | (2006.01) |
| ***F16J 15/00*** | (2006.01) |
| ***F01D 11/02*** | (2006.01) |

(52) U.S. Cl.
USPC ................ 29/700; 29/889.2; 29/525; 29/270; 29/281.1; 29/235; 29/23.51; 269/24; 277/345; 277/411; 277/423; 415/173.5

(58) Field of Classification Search
USPC ........... 29/700, 889, 889.2, 889.21, 446, 450, 29/451, 252, 270, 243.5, 281.1, 235, 29/888.044, 23.51; 269/32, 24, 249, 143; 277/345, 409, 411, 413, 423; 415/173.1, 173.5, 174.5
See application file for complete search history.

(56) References Cited

U.S. PATENT DOCUMENTS

| | | | | |
|---|---|---|---|---|
| 3,571,886 | A * | 3/1971 | Corsmeier | 29/270 |
| 4,344,740 | A | 8/1982 | Trenschel et al. | |
| 4,480,957 | A | 11/1984 | Patel et al. | |
| 5,577,887 | A | 11/1996 | Gouyon et al. | |
| 6,065,938 | A | 5/2000 | Bartsch | |
| 6,416,280 | B1 | 7/2002 | Forrester et al. | |
| 6,499,993 | B2 | 12/2002 | Steber et al. | |
| 6,846,159 | B2 | 1/2005 | Zabawa et al. | |
| 6,951,448 | B2 | 10/2005 | Duesler et al. | |
| 7,025,563 | B2 | 4/2006 | Servadio et al. | |
| 7,040,866 | B2 | 5/2006 | Gagner | |
| 7,093,448 | B2 | 8/2006 | Nguyen et al. | |
| 7,153,098 | B2 | 12/2006 | Zabawa | |
| 7,229,252 | B2 | 6/2007 | Hermiston et al. | |
| 7,241,109 | B2 | 7/2007 | Ferra | |

(Continued)

*Primary Examiner* — David Bryant
*Assistant Examiner* — Jun Yoo

(57) ABSTRACT

Gas turbine engine systems involving rotor bayonet coverplates and tools for installing such coverplates are provided. In this regard, a representative turbine assembly for a gas turbine engine includes: a turbine disk operative to mount a set of turbine blades; and a coverplate having an annular main body portion and a spaced annular arrangement of tabs extending radially inwardly from the main body portion with open-ended gaps being located between the tabs, the tabs being operative to secure an inner diameter of the coverplate to the turbine disk.

6 Claims, 5 Drawing Sheets

(56) References Cited

U.S. PATENT DOCUMENTS

| | | | | |
|---|---|---|---|---|
| 7,987,600 | B2 * | 8/2011 | Erill et al. | 29/898.07 |
| 8,181,326 | B2 * | 5/2012 | Silliman et al. | 29/451 |
| 2007/0014668 | A1 | 1/2007 | Engle | |
| 2007/0059163 | A1 | 3/2007 | Tiemann | |

* cited by examiner

GAS TURBINE SYSTEMS INVOLVING ROTOR BAYONET COVERPLATES AND TOOLS FOR INSTALLING SUCH COVERPLATES

CROSS-REFERENCE TO RELATED APPLICATIONS

This application is a divisional of U.S. patent application Ser. No. 11/952,367 filed Dec. 7, 2007, which is hereby incorporated by reference in its entirety.

STATEMENT REGARDING FEDERALLY SPONSORED RESEARCH AND DEVELOPMENT

The U.S. Government may have an interest in the subject matter of this disclosure as provided for by the terms of contract number N00421-99-C-1270 awarded by the United States Navy.

BACKGROUND

1. Technical Field

The disclosure generally relates to gas turbine engines.

2. Description of the Related Art

Turbines of gas turbine engines typically incorporate alternating sets of rotating blades and stationary vanes. In this regard, it is commonplace to incorporate seals between the adjacent sets of blades and vanes. Such seals tend to prevent cooling air leakage from the inner cavities to the gas flow path along which the vanes and blades are located. Oftentimes, such a seal is provided by a coverplate that is secured to a turbine disk, which mounts a set of rotating blades. These coverplates are also often used to provide blade retention.

A bayonet type coverplate is typically characterized by having slotted appendages that interface with corresponding slotted appendages located radially inboard of the live rim of the disk on which the coverplate is mounted. This interface provides axial retention for the coverplate. Radial retention for the coverplate is typically created by a surface located radially inboard of the live rim of the disk. When cooling air for the blades needs to pass through the coverplate, holes are often used. These holes can create high stress concentrations and can limit the operational life of the coverplate.

Additionally, coverplate installation and removal typically involves high tool forces, heating of the turbine disk and/or cooling of the coverplate to relieve interference fits. Unfortunately, these techniques can often be complex and difficult.

SUMMARY

Gas turbine engine systems involving rotor bayonet coverplates and tools for installing such coverplates are provided. In this regard, an exemplary embodiment of a turbine assembly for a gas turbine engine comprises: a turbine disk operative to mount a set of turbine blades; and a coverplate having an annular main body portion and a spaced annular arrangement of tabs extending radially inwardly from the main body portion with open-ended gaps being located between the tabs, the tabs being operative to secure an inner diameter of the coverplate to the turbine disk.

An exemplary embodiment of a coverplate for a turbine disk of a gas turbine engine comprises: a main body portion defining a downstream, annular cavity; and a spaced annular arrangement of tabs extending radially inwardly from the main body portion, the tabs being operative to secure an inner diameter of the coverplate to the turbine disk.

An exemplary embodiment of a tool for installing a coverplate on and removing a coverplate from a turbine disk of a gas turbine engine comprises: a body portion; upstream and downstream axial compression surfaces operative to be positioned along a range of axial positions relative to each other such that engagement of the axial compression surfaces with a coverplate applies an axial compression load to the coverplate; and a radial compression surface operative to be positioned along a range of radial positions with respect to the body portion such that engagement of the radial compression surface with the coverplate applies a radial load to the coverplate.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving rotor bayonet coverplates and tools for installing such coverplates are provided, several exemplary embodiments of which will be described in detail. In some embodiments, the coverplate extends radially outwardly beyond the live rim (i.e., into the dead rim) of the turbine disk to which the coverplate is installed. Additionally or alternatively, some embodiments incorporate a spaced annular arrangement of tabs that interlock with corresponding annularly spaced locking features of the turbine disk. In addition to securing the coverplate to the turbine disk, locations between the tabs provide open passages that permit the flow of cooling air.

Figure 1:
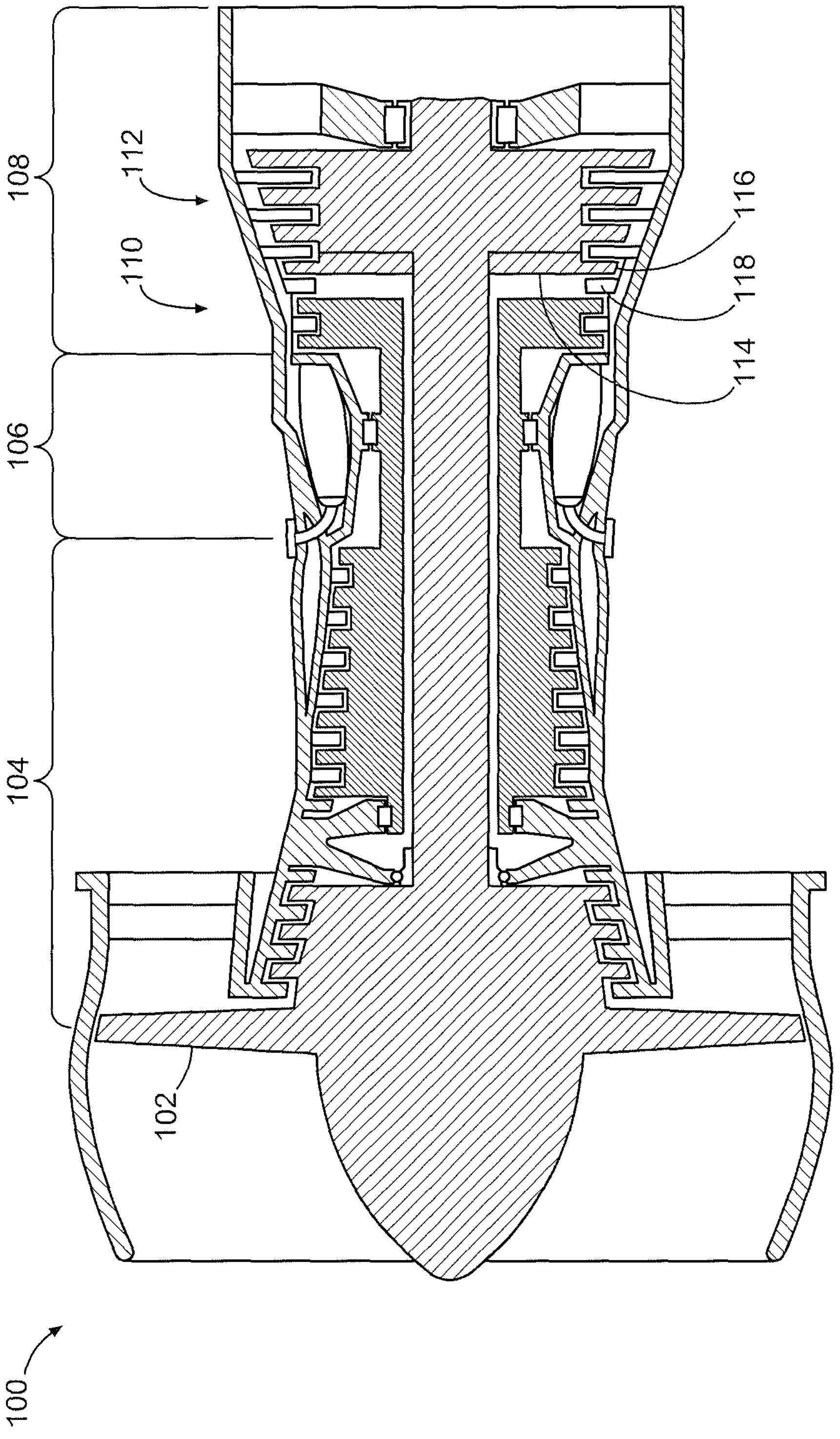
FIG. 1 is a schematic diagram depicting an exemplary embodiment of a gas turbine engine.

FIG. 1 is a schematic diagram depicting an exemplary embodiment of a gas turbine engine. As shown in FIG. 1, engine 100 incorporates a fan 102, a compressor section 104, a combustion section 106 and a turbine section 108. Specifically, turbine section 108 includes a high-pressure turbine 110 and a low-pressure turbine 112. Notably, the turbines include turbine disks, with a set of blades being mounted to a corresponding turbine disk. By way of example, turbine disk 114 includes a set of blades, e.g., blade 116, with these blades being located immediately downstream of a set of vanes, e.g., vane 118. Although depicted in FIG. 1 as a turbofan gas turbine engine, there is no intention to limit the concepts described herein to use with turbofans as other types of gas turbine engines can be used. Moreover, there is no intention to limit the concepts described herein to use in turbine sections as the concepts can be used in other sections of an engine as well.

Figure 2:
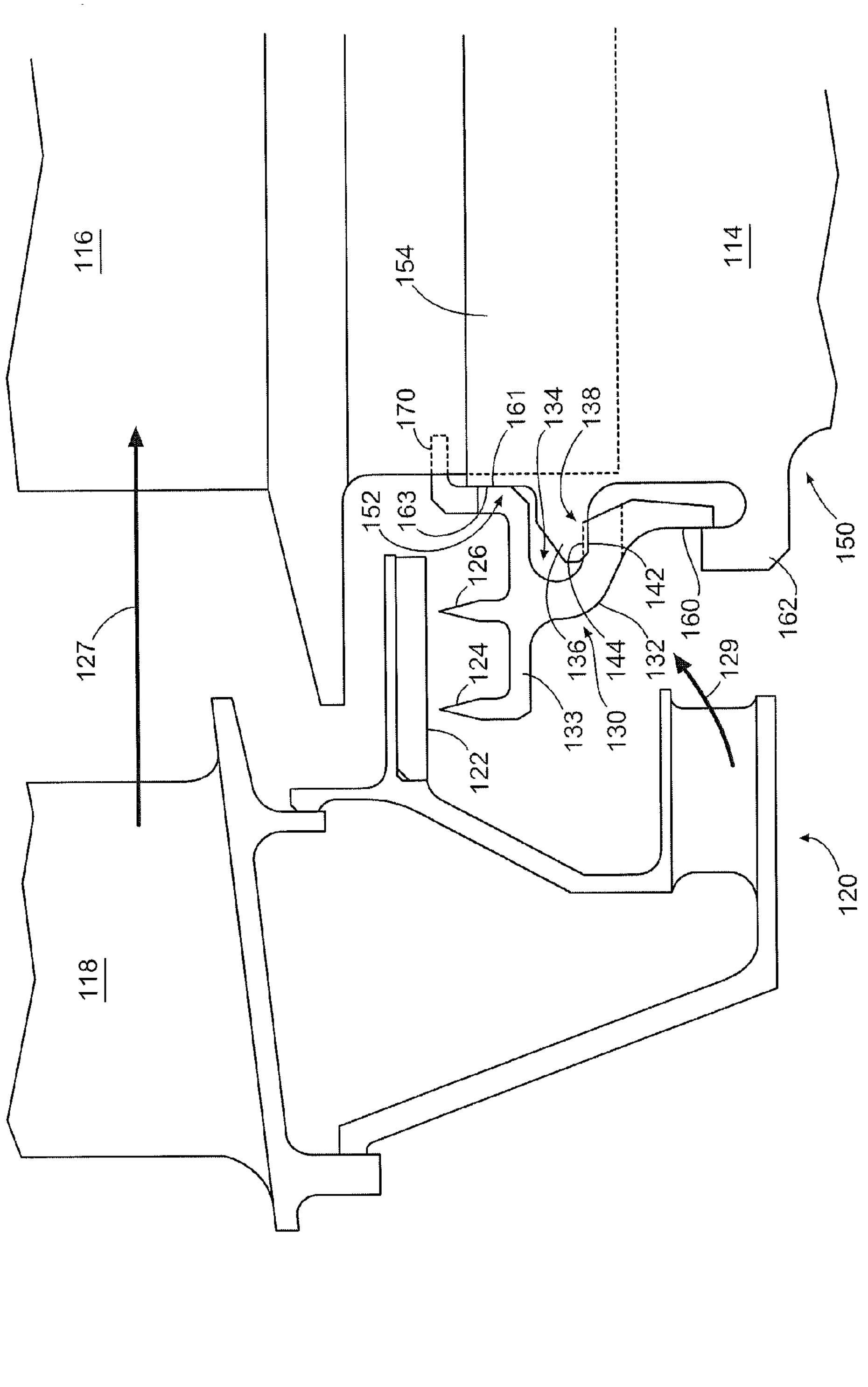
FIG. 2 is schematic diagram depicting the portion of the turbine of the embodiment of FIG. 1.

With reference to the partially cut-away, schematic diagram of FIG. 2, vane 118 is attached to an assembly 120 that includes an annular land 122. The land 122 is operatively engaged by knife edges 124, 126 of a rotor bayonet coverplate 130 to form an annular seal between a gas flow path 127 (along which vane 118 and blade 116 are located) and a cooling air path 129. In the embodiment of FIG. 2, the coverplate 130 is attached to an upstream side of turbine disk 114.

Figure 3:
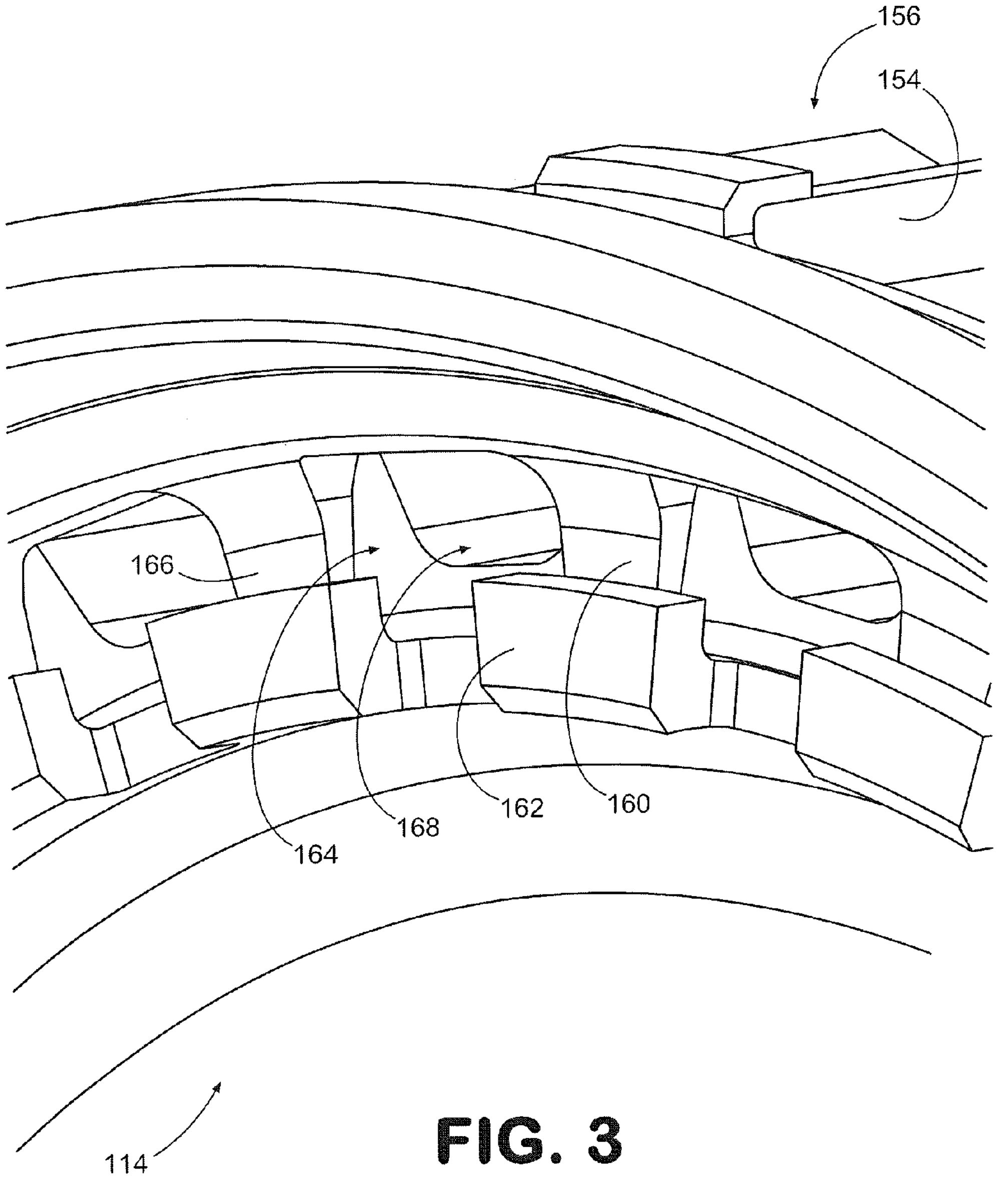
FIG. 3 is a partially cut-away, perspective view of a portion of the coverplate and turbine disk of FIG. 2.
Figure 4:
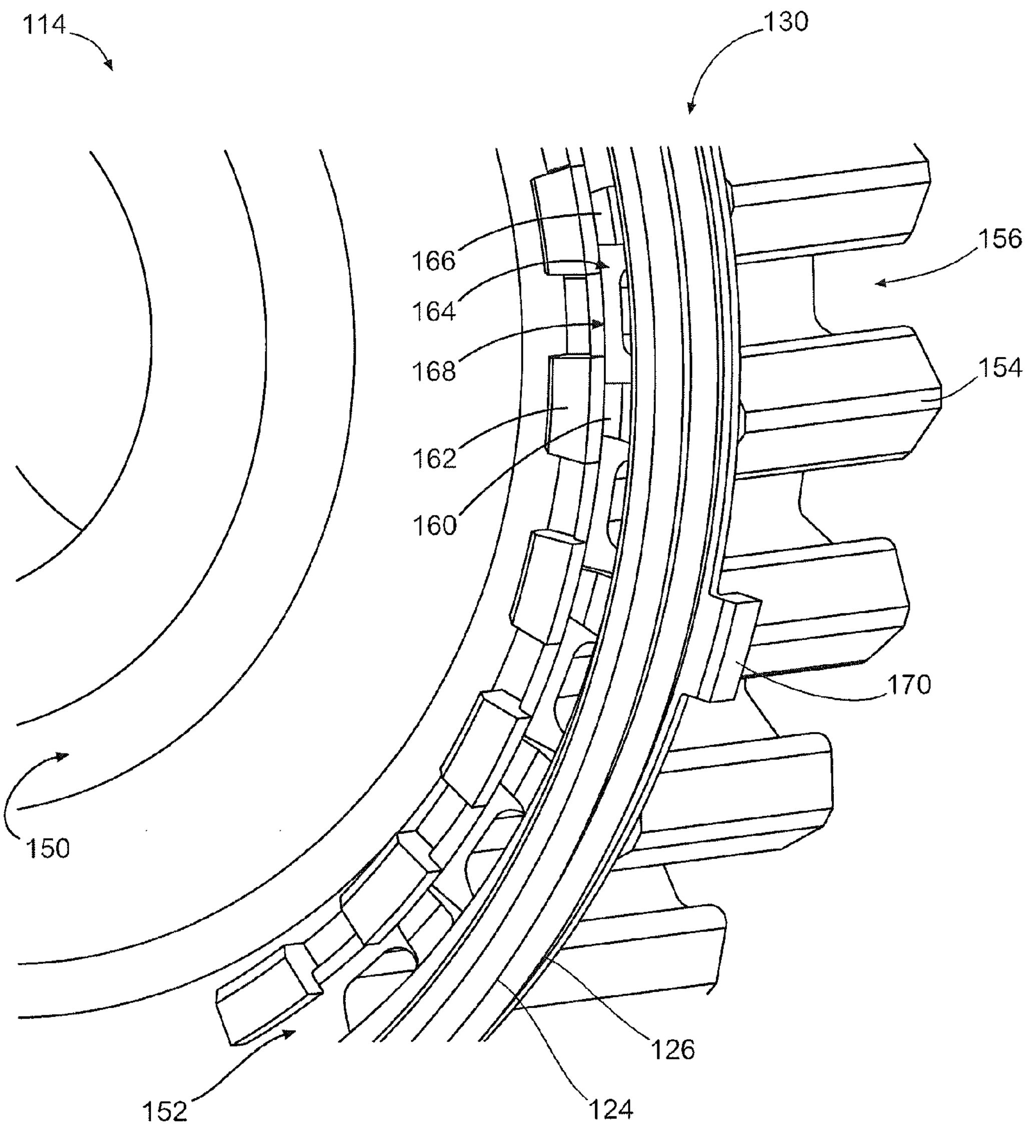
FIG. 4 is a partially cut-away, perspective view of a portion of the coverplate and turbine disk of FIG. 2.

As shown in FIGS. 2-4, coverplate 130 is annular in shape and incorporates a main body portion 132 formed of circumferentially continuous material that is capable of carrying hoop stresses. Knife edges 124, 126 extend radially outwardly from an annular extended portion 133, which extends axially upstream from the main body portion. The main body portion defines a downstream, annular cavity 134 that is positioned between the turbine disk and the coverplate when the coverplate is installed. Annular cavity 134 is configured to receive corresponding protrusions (e.g., protrusion 136) that extend from the upstream surface of the turbine disk. The protrusions are annularly spaced about the turbine disk and are received within a recess 138 located along an inner diameter surface of annular cavity 134. Receipt of a protrusion within the recess provides radial interference between the coverplate and the turbine disk. By way of example, engagement of an inner diameter surface 142 of protrusion 136 with a corresponding surface 144 of the recess inhibits outward radial movement of the coverplate with respect to the turbine disk.

The radial interference between the coverplate and disk is located radially outboard of the disk live rim. Notably, the live rim is defined by continuous material capable of carrying hoops stresses. This configuration tends to reduce coverplate weight significantly compared to conventional configurations. Because of the weight savings, there is potentially a weight savings for the host turbine disk as well.

As shown more clearly in FIGS. 3 and 4, turbine disk 114 includes a main body section 150 located below the live rim. Radially outboard of the live rim is a dead rim 152, which is unable to carry hoop stresses because the material, which includes disk attachment lugs (e.g., disk attachment lug 154), is circumferentially discontinuous. Notably, the disk attachment lugs form spaced slots (e.g., slot 156) that receive complementary-shaped portions of turbine blades to secure the blades to the turbine disk.

A spaced set of locking tabs (e.g., locking tab 160) extend radially inwardly from main body portion 132 of the coverplate. Notably, in the embodiment of FIGS. 2-4, only the distal end portions of the locking tabs extend radially inwardly beyond the edge of the dead rim 152.

As shown more clearly in FIG. 3, the inwardly extending locking tabs form axial interference fits with corresponding flange segments that extend outwardly from the turbine disk. For instance, locking tab 160 axially interferes with flange segment 162, thereby inhibiting axial movement of the coverplate with respect to the turbine disk in an upstream direction. Notably, surface 161 of the coverplate engages surface 163 of the turbine disk to inhibit axial movement of the coverplate with respect to the turbine disk in a downstream direction. Open-ended gaps located between the locking tabs define cooling air paths that communicate with the slots formed between the disk attachment lugs. By way of example, gap 164 located between locking tabs 160 and 166 defines a cooling air opening 168 that communicates with slot 156. Notably, in those embodiments incorporating the open-ended gaps, such gaps can replace cooling holes conventionally formed in coverplates. The use of open-ended gaps tends to result in lower stress concentrations in a vicinity of the gaps as compared to a vicinity of the cooling holes. This can improve the operational life of the coverplate and provide opportunities for more weight reduction.

As best shown in FIGS. 2 and 4, an anti-rotation tab 170 extends axially downstream from the main body portion of the coverplate. The anti-rotation tab extends into a slot located between adjacent blade platform necks. As such, anti-rotation tab 170 can inhibit rotational movement of the coverplate with respect to the turbine disk.

Figure 5:
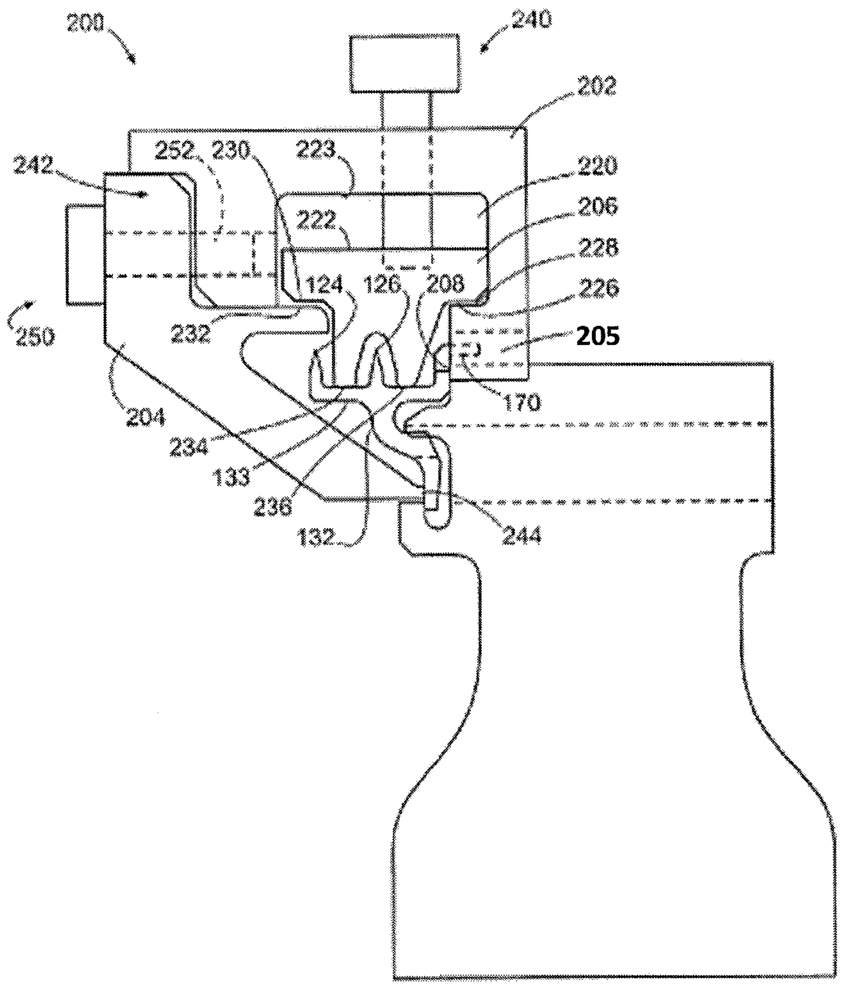
FIG. 5 is a schematic diagram depicting an embodiment of an installation tool.

An embodiment of a tool for installing a coverplate to a turbine disk is depicted schematically in FIG. 5. As shown in FIG. 5, tool 200 includes an annular base 202 that receives an axial compression ring 204 and an annular arrangement of radial compression jaws (e.g., jaw 206). Base 202 includes radial fingers (e.g., finger 205) that fit in between disk attachment lugs. The space between the fingers can receive the antirotation tabs of the coverplate. Surfaces (e.g., surface 208) of the radial fingers serve as downstream axial compression surfaces for compressing the coverplate.

The radial compression jaws are received at least partially within an annular cavity 220 of the base. Each of the jaws is movable between a radial outboard position (not shown) and a radial inboard position. In the embodiment of FIG. 5, the outboard position is established by contact between an outer diameter surface (e.g., surface 222) of a jaw and an annular surface 223 of the base that defines a portion of the cavity. Also in the embodiment of FIG. 5, the inboard position is established by contact between a downstream ledge 226 of a jaw and an annular flange 228 of the base. Notably, an upstream ledge 230 of the jaw is configured to contact a flange 232 of the axial compression ring.

Radial compression jaw 206 incorporates dual compression surfaces 234, 236 that are spaced from each other to facilitate radial compression of the coverplate. Each of the compression surfaces is aligned with a corresponding surface of the coverplate. In the embodiment of FIG. 5, surface 234 is configured to engage the extended portion 133 between the knife edges 124, 126, and surface 236 is configured to engage the main body portion 132 between the knife edge 126 and the anti-rotation tab 170. Other numbers and configurations of compression surfaces can be used in other embodiments.

Positioning of a radial compression jaw is facilitated by a radial adjustment mechanism (e.g., mechanism 240). In the embodiment of FIG. 5, the radial adjustment mechanism for jaw 206 is configured as a bolt that when turned mechanically urges the jaw against the coverplate and into a desired position within the cavity 220.

Axial compression of the coverplate is facilitated by axial compression ring 204, which also is moveably attached to the base. In the embodiment of FIG. 5, the axial compression ring is seated within an annular recess 242 of the base. The axial compression ring incorporates an upstream annular compression surface 244 that is configured to engage the locking tabs of the coverplate. In other embodiments, multiple compression surfaces can be used.

An adjustment mechanism 250 that incorporates an annular arrangement of bolts (e.g., bolt 252) facilitates axial positioning of the axial compression ring with respect to the base. In contrast to the compression jaws, which can be moved between radial outboard and inboard positions, the axial compression ring can be moved between axial upstream and downstream positions. In the upstream position, the compression surface 244 is positioned away from corresponding locking tabs of the coverplate. In the downstream position, the compression surface urges the locking tabs toward the turbine disk to provide clearance between the locking tabs of the coverplate and corresponding flange segments of the turbine disk. The compression force is reacted out by the fingers on the downstream side of the main body.

The combined axial and radial compression from the tool releases the interference fits between the coverplate and disk. This allows the coverplate to be positioned onto the disk or taken off the disk with little additional force and no heating or cooling of components.

For installation, the coverplate is positioned inside the tool, which compresses the coverplate radially and axially. The coverplate and tool are then brought towards the disk so that the coverplate locking tabs fit between corresponding tabs of the disk. The coverplate and tool are then rotated so that the coverplate tabs are positioned behind the disk tabs and coverplate cooling air openings are aligned properly with the disk. The axial and radial compression is then removed from the coverplate. Blades are installed surrounding the coverplate antirotation tabs, thus providing positive antirotation. Removal of the coverplate is the opposite of installation.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A tool for installing a coverplate on and removing a coverplate from a turbine disk of a gas turbine engine, the coverplate extending axially between an upstream portion and a downstream portion, the tool comprising:

a body portion;

upstream and downstream axial compression surfaces operative to be positioned along a range of axial positions relative to each other such that engagement of the axial compression surfaces with a coverplate applies an axial compression load to the coverplate; and a radial compression surface operative to be positioned along a range of radial positions with respect to the body portion such that engagement of the radial compression surface with the coverplate applies a radial load to the coverplate.

2. The tool of claim 1, wherein at least one of the axial compression surfaces is an annular surface.

3. The tool of claim 1, wherein:

the tool comprises a radial compression jaw; and the radial compression surface is a surface of the radial compression jaw.

4. A tool fbr installing a coverplate on and removing a coverplate from a turbine disk of a gas turbine engine, the coverplate extending axially between an upstream portion and a downstream portion, the tool comprising:

a body portion;

upstream and downstream axial compression surfaces operative to be positioned along a range of axial positions relative to each other such that engagement of the axial compression surfaces with a coverplate applies an axial compression load to the coverplate; and a radial compression surface operative to be positioned along a range of radial positions with respect to the body portion such that engagement of the radial compression surface with the coverplate applies a radial load to the coverplate;

wherein the tool comprises a radial compression jaw;

wherein the radial compression surface is a surface of the radial compression jaw;

wherein the body portion defines an annular cavity; and wherein the radial compression jaw is mounted at least partially within the cavity.

5. The tool of claim 4, wherein:

the radial compression jaw is a first of multiple radial compression jaws, each of which has a corresponding radial compression surface; and each of the multiple radial compression jaws is mounted at least partially within the cavity.

6. A tool for installing a coverplate on and removing a coverplate from a turbine disk of a gas turbine engine, the coverplate extending axially between an upstream portion and a downstream portion, the tool comprising:

a body portion;

upstream and downstream axial compression surfaces operative to be positioned along a range of axial positions relative to each other such that engagement of the axial compression surfaces with a coverplate applies an axial compression load to the coverplate; and a radial compression surface operative to be positioned along a range of radial positions with respect to the body portion such that engagement of the radial compression surface with the coverplate applies a radial load to the coverplate;

wherein axial positioning of the axial compression surface is facilitated by a first annular arrangement of bolts extending through the body portion; and wherein radial positioning of the radial compression surface is facilitated by a second annular arrangement of bolts extending through the body portion.

* * * * *